(12) United States Patent
Dhurjaty et al.

(10) Patent No.: US 7,211,802 B1
(45) Date of Patent: *May 1, 2007

(54) X-RAY IMPINGEMENT EVENT DETECTION SYSTEM AND METHOD FOR A DIGITAL RADIOGRAPHY DETECTOR

(75) Inventors: Sreeram Dhurjaty, Rochester, NY (US); Gordon Geisbuesch, Fairport, NY (US); John Yorkston, Penfield, NY (US); Joshua M. Silbermann, Rochester, NY (US); Jeffery R. Hawver, Marion, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/323,505

(22) Filed: Dec. 30, 2005

(51) Int. Cl.
*G01T 1/24* (2006.01)
*H05G 1/60* (2006.01)

(52) U.S. Cl. .................. 250/370.09; 250/370.08; 378/21

(58) Field of Classification Search ........... 250/370.09, 250/370.08, 370.01; 378/21, 114
See application file for complete search history.

(56) References Cited

U.S. PATENT DOCUMENTS

| 6,069,835 A | 5/2000 | Matoba et al. |
| 6,069,935 A | 5/2000 | Schick et al. |
| 6,404,845 B1 | 6/2002 | Sharpless et al. |
| 6,760,405 B2* | 7/2004 | Ruetten et al. ............ 378/98.8 |
| 6,797,960 B1* | 9/2004 | Spartiotis et al. ....... 250/370.09 |
| 6,862,338 B2* | 3/2005 | Kinno et al. ............... 378/98.8 |
| 2004/0065836 A1 | 4/2004 | Schick et al. |
| 2004/0099792 A1* | 5/2004 | Ducourant et al. ..... 250/214 R |
| 2005/0285043 A1* | 12/2005 | Nascetti et al. ........ 250/370.09 |

OTHER PUBLICATIONS

U.S. Appl. No. 11/409,883, filed Apr. 2006, Dhurjaty et al.*

* cited by examiner

*Primary Examiner*—David Porta
*Assistant Examiner*—David S. Baker
(74) *Attorney, Agent, or Firm*—Susan L. Parulski

(57) ABSTRACT

A wireless, independent digital imaging sensor utilizes an external charge balance capacitor to establish a sense voltage at a common node between the charge capacitor and the pixel intrinsic capacitors in the sensor panel. A variable width pulse train responds to the sense voltage to control injection of charge to the external capacitor to maintain a constant voltage at the common equal to a reference voltage. An increase in pulse width above a threshold level representative of the onset of X-ray exposure is detected to generate an output control signal used to control subsequent image acquisition functions of the imaging sensor.

28 Claims, 3 Drawing Sheets

X-RAY IMPINGEMENT EVENT DETECTION SYSTEM AND METHOD FOR A DIGITAL RADIOGRAPHY DETECTOR

FIELD OF THE INVENTION

The general field of this invention is digital image radiography and, in particular, to digital radiography systems in which the digital imaging panel and accompanying electronics are in wireless communication with the main radiography system and may be used interchangeably with various manufacturer's X-ray systems.

BACKGROUND OF THE INVENTION

Digital radiography is achieving a growing acceptance as an alternative to photographic-based imaging technologies that rely on photographic film layers to capture radiation exposure to produce and store an image of a subject's internal physical features. With digital radiography, the radiation image exposures captured on radiation sensitive layers are converted, pixel by pixel, to electronic image data which is then stored in memory banks for subsequent read-out and display on suitable electronic image display devices. One of the driving forces in the success of digital radiography is the ability to rapidly visualize and communicate stored images via data networks to one or more remote locations for analysis and diagnosis by radiologists without the delay caused by having to send physical films through the mail or via couriers to reach the remotely located radiologists.

Digital radiography panels have two-dimensional array of detecting elements ("pixels") organized in rows and columns. To read out image information from the panel, rows of pixels are usually selected sequentially and the corresponding pixel on each column is connected to a charge amplifier. The outputs of the charge amplifiers from each column are applied to analog-to-digital converters to generate digitized image data that then can be stored and suitably image processed as needed for subsequent display.

In order to synchronize image acquisition and subsequent data readout from the imaging panel, it is necessary to synchronize control of the panel operation with the occurrence of impinging imaging X-rays from a remote X-ray source contained in the digital radiography imaging system. This can be done by communicating control signals indicating start and stop of the X-ray source via a cable wire tether. More recently, wireless imaging cassettes have been proposed that operate independently of the main system by using X-ray sensors in the imaging cassette to detect the onset and terminate of the impinging X-rays from the remote X-ray source. Examples of such wireless and/or independent X-ray impingement sensing are found in U.S. Pat. No. 6,069,935. In one such example, dedicated X-ray event trigger diodes located in the imaging cassette outside the imaging panel are monitored by a computer to detect incident radiation and output a signal indicating same. Such a system has certain drawbacks. The inclusion of the trigger diodes lowers manufacturing yields thereby making the cassettes unduly costly. Also, the diodes themselves may be blocked by some radiation impervious portion of the object under test or may be out of the field of the radiation beam entirely. In another example described in this patent, the sensors of the imaging panel itself are continuously read out using frame-grabbing techniques. Determination of whether the imaging sensors were exposed to X-rays is made by continuously reading out the frames of data from the entirety of the panel sensors and determining whether the panel was exposed to X-rays by examining the frames of data. A drawback is that the sensors must be read out continuously which consumes a relatively high amount of electrical power which can be a serious problem for a battery-power cassette operating independently of the main imaging system.

Another example is found in U.S. Pat. No. 6,404,845 B1 in which certain reference pixels in the imaging panel are monitored during a wait for exposure period, with the values of the reference pixels being compared to a predetermined threshold level. When a predetermined number of the reference pixels exceed the threshold level, a determination is made that the exposure level has commenced. This approach, however, also consumes a high amount of power and is, therefore, a less than desirable solution.

Yet another example is found in patent application US 2004/0065836 A1. In this example, the occurrence of X-radiation on an imaging panel is detected by monitoring the amount of current drawn by the imaging pixels in the panel and an X-ray occurrence signal is generated when the amount of current drawn exceeds a predetermined amount. However, the example disclosed in this application is limited to use with CMOS or CCD sensors and is not applicable to other types of sensors such a amorphous or crystalline silicon photodiodes or metal insulated semiconductor (MIS) sensor in extensive use in filmless imaging X-ray sensor panels.

There is therefore a need for a wireless X-ray imaging sensor panel capable of operating independently of the main imaging system that is cost effective to manufacture and that can reliably detect the occurrence of impinging X-rays from an X-ray source in the main imaging system.

SUMMARY OF THE INVENTION

In accordance with one aspect of the invention, a digital radiography X-ray imaging sensor is provided that is adapted for independent detection of the existence of impinging X-rays from a remote X-ray source and which comprises an imaging panel that includes a two-dimensional array of imaging pixels, wherein each of the pixels has an intrinsic capacitor which is charged, directly or indirectly, by the impinging X-rays to establish an image of an object being X-rayed. The X-ray imaging sensor also includes a source of a reference voltage, a charge balance capacitor connected at a common node to the pixel intrinsic capacitors, and a control unit for varying a level of charge injection to the charge balance capacitor in response to changes in charge balance between the pixel capacitors and the charge balance capacitor for maintaining a constant charge voltage on the common node as determined by the reference voltage. The image sensor further includes a control signal generator that is responsive to the control unit for indicating presence of impinging X-rays on the imaging panel when the level of charge injection exceeds a predetermined threshold value.

In a presently preferred embodiment of the invention, the X-ray imaging sensor of the type described is provided with an imaging panel including a two-dimensional array of imaging pixels, each of the pixels having an intrinsic capacitor which is charged, directly or indirectly, by the impinging X-rays to establish an image of an object being X-rayed, and an external capacitor connected at a common node to the pixel intrinsic capacitor. The X-ray imaging sensor is further provided with an impinging X-ray detection unit which includes a reference voltage source, a source of charge voltage coupled to the common node, and a source of a pulse-width-modulated train of pulses switchably connected to the charge voltage source and the common node to vary injection of charge to the external capacitor to establish a voltage on the common node representative of charge balance between the external capacitor and the pixel capacitors. The detection unit also includes a controller operative during a period while awaiting onset of impinging X-rays to set the pulse width of the pulse train at a first duration necessary to maintain the common node voltage at a predetermined value determined by the reference voltage and for adjusting the pulse width to a second duration necessary to maintain the common node voltage at this predetermined value during impingement of the X-rays on the panel. The detection unit finally includes a pulse width detection circuit responsive to the second pulse width duration for outputting an X-ray detection signal indicative of impingement of X-rays from the remote source.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
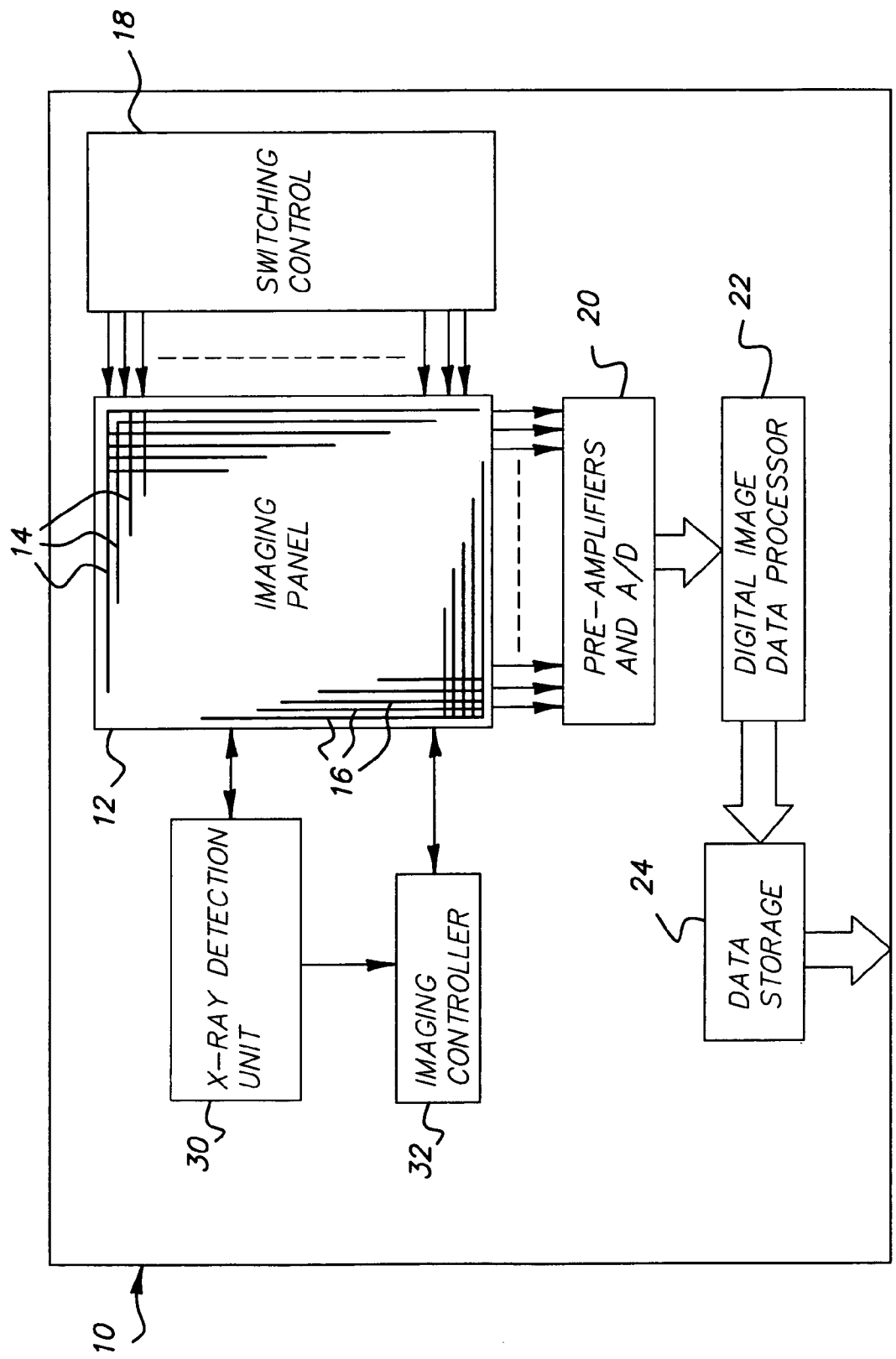
FIG. 1 is a block diagram of an X-ray sensor system of the type useful in the present invention.

Referring to FIG. 1, an X-ray imaging sensor 10 comprises a flat panel X-ray imaging panel 12 in which discrete X-ray pixels are arranged in a two-dimensional array of rows and columns 14 and 16, respectively. As is well known in the art of digital radiography, the material in the pixels converts impinging X-rays into electrons which are initially stored in a charge element of the pixel for subsequent readout, typically done row-by-row under the control of a switching control unit 18. The charge of pixels in each column are conveyed in sequence, one row at a time, to charge amplifier (pre-amplifier) circuits, one for each column, in unit 20 and the charge values for each pixel are then converted by analog-to-digital (A/D) converters to digital data stored locally in RAM memory for subsequent transfer to a system digital image data processor 22 for suitable image processing operations prior to storage in a data storage unit 24.

In accordance with the invention, an X-ray detection unit 30, described in more detail below, operates to monitor the imaging panel 12 to detect the onset of impinging X-rays from a remote X-ray source to generate output control signals which are applied to imaging controller 32. Imaging controller 32, in turn, operates in response to the control signals from detection unit 30 to control, in known manner, the timing of readout of imaging pixel charge values from panel 12, among other known functions.

Figures 2, 3:
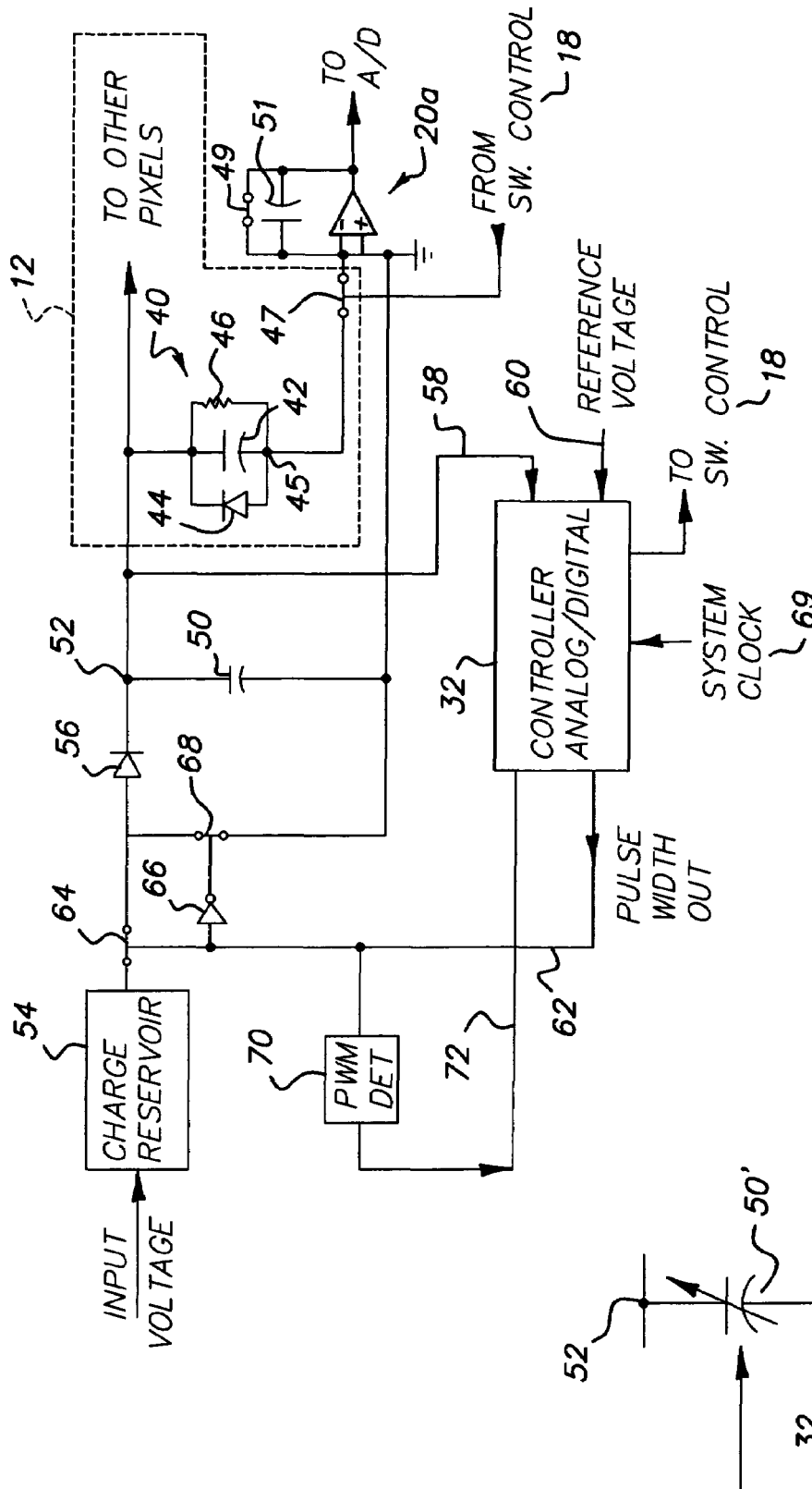
FIG. 2 is a schematic drawing of an X-ray imaging sensor of the present invention.
FIG. 3 is a schematic drawing of a portion of the imaging sensor of FIG. 2 representing an alternative embodiment of the invention.

Referring now to FIG. 2, an X-ray sensing pixel, one of several million in imaging panel 12, is represented by an equivalent circuit 40 which includes an intrinsic capacitance (capacitor) 42, a reverse biased diode 44 and a leakage current impedance 46. As is well known, the pixel element may be an amorphous or crystalline photodiode (indirect radiography) or a metal insulated semiconductor (MIS) for direct radiography.

An external charge balance capacitor 50 is connected to a node 52 which is in common with all of the intrinsic capacitors 42 of the sensor pixels 40 in imaging panel 12. A charge reservoir 54 serves as a source of charge voltage which is coupled to node 52 via an isolation diode 56. Node 52 is coupled via a sense voltage line 58 to a comparator in controller 32 for comparison with a reference voltage 60 which is used to set a pixel bias voltage on node 52. A train of variable width pulses is generated in controller 32 and applied via line 62 to a solid state FET switch 64 to control a level of charge injection from reservoir 54 to charge balance capacitor 50.

The voltage input to reservoir 54 generates a reservoir of charge which is metered to the charge balance capacitor 50 by the opening and closing of switch 64 under the control of the variable width pulses on line 62 generated in controller 32 in synchronism with a system clock 69. These pulses are inverted by inverter 66 to close and open FET switch 68 in opposite sequence to the opening and closing of switch 64. Thus when switch 64 is opened to block charge injection to capacitor 50, switch 68 is closed to tie the anode of diode 56 to ground to further enhance isolation of the charge reservoir from capacitor 50 and the pixel capacitors 42. Assuming that the input voltage to the charge reservoir and the voltage on node 52 are both positive, pixel diode 44 denotes that the pixel is reverse biased. Capacitor 42 represents the inherent or intrinsic capacitance in the diode 44 and impedance 46 represents the diode leakage resistance, which is used to model leakage currents. When a plurality of pixels is biased by the voltage on node 52, the equivalent circuit 40 may also be used to represented the parallel combination of the capacitances and resistances of each pixel. For example in a flat panel that has 2.5 Million pixels, if each pixel has a capacitance of 1 µF, the equivalent capacitance would be 2.5 µF. Similarly the shunt or leakage resistance would be the resistance of an individual pixel divided by 2.5 million. Charge capacitor 50 may be of a nominal value, for example, 100 pF.

During operating periods when there is no impingement of X-rays on the imaging panel, each individual pixel in a column has its node 45 opposite to common node 52 connected through FET switch 47 to a virtual ground potential at the readout input of the associated charge preamplifier 20a for that column. All pixels are thus maintained in a normally ON, albeit reversed biased, state pending the occurrence of the exposure of the imaging panel pixels to impinging imaging X-rays.

In operation, when the panel is idle and waiting for the bias voltage on node 52 to stabilize, the voltage on node 52 is compared in controller 32 with the reference voltage on line 60. Controller 32 then operates in response to this comparison to vary the widths of the pulses applied to switches 64 and 68 to in order to inject suitable amounts of charge into capacitor 50 to result in the voltage on node 52 stabilizing at a value equal to the reference voltage 60.

When the voltage on node reaches a value equal to the reference voltage 60, the pulse width emanating from the controller 32 is at a first value which is ideally zero or, as a practical matter, at a very narrow width needed just sufficient to compensate for charge leaking out of the parasitic elements in the imaging panel during this state.

While the panel is idle and awaiting exposure to impinging X-rays, switches 47 and 49 are held closed. This allows the node 45 of the pixel connected to switch 47 to be at virtual ground due to the action of the amplifier 20. Closing of switch 49 in amplifier 20a allows the bias currents to bypass capacitor 51 so as to prevent the amplifier from saturating.

At the onset of imaging X-ray exposure to the imaging panel pixels, a charge is created on each of the pixel capacitors 42. This results in a change of voltage on the capacitor 50 and at common node 52 due to charge-balance between capacitor 50, on the one hand, and the parallel capacitance of all the pixel capacitors 42, on the other hand. The magnitude of the change of the voltage on node 52 depends on the relative sizes of capacitor 50 and the parallel capacitance of pixel capacitors 42. Smaller values of the pixels' capacitance will elicit a smaller change of voltage. Changes in voltage on node 52 result in corresponding changes of pulse width on line 62 in order to increase charge injection from reservoir 54 and return the voltage on node 52 to the level of the reference voltage 60 so as to maintain a constant voltage on node 52. Pulse width modulation detector 70 continuously monitors the pulse train from controller 32 and when the detected pulse widths rise above a predetermined threshold related to the impingement of X-rays on the imaging panel 12, an output control signal indicative of the impingement of X-rays is sent on line 72 to controller 32. Once the onset of X-ray impingement is detected, controller 32 acts to open switches 47 allowing the pixel capacitors to fully charge in proportion to the intensity of X-ray flux impinging on the pixel.

In a preferred embodiment of the invention, upon detection of X-ray impingement, controller 32 acts to open all but one segment of the imaging pixel switches 47. Preferably, this segment comprises at least one row of pixels which remain in an ON state during the exposure to impinging X-rays. This feature allows for reliable detection of cessation of exposure when the absence of impinging X-rays results in a narrowing of pulse widths so as to fall below the X-ray impingement level.

In FIG. 3, fixed charge capacitor 50 is replaced by a variable charge capacitor 50', the capacitance value of which is lowered by controller 32 immediately after detection of the onset of X-ray impingement. This lowering of the capacitor 50' value is coincident with the opening of the switches 47 in panel 12 for all but one segment of pixels as previously described above. By lowering the capacitor 50' to a suitable value in concert with the lowered capacitance value of those pixels that remain connected to virtual ground through their respective switches 47, the feedback sensitivity to signal variations at node 52 is greatly enhanced over what it would be if the value of capacitor 50' were not varied in this manner. As a result, detection of the cessation of X-ray impingement is markedly improved over the constant capacitor embodiment of FIG. 2.

Figure 4:
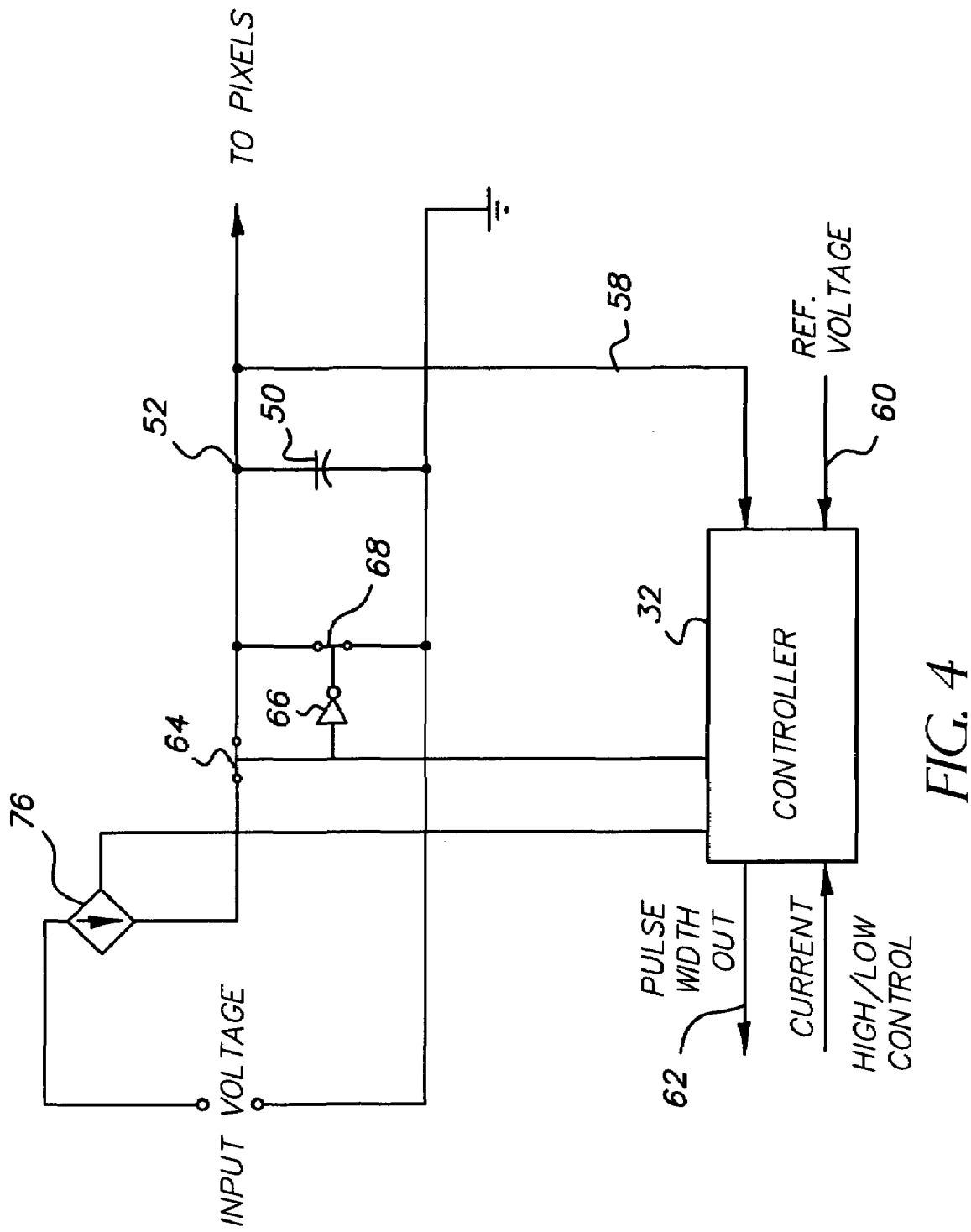
FIG. 4 is a schematic drawing of a portion of the imaging sensor of FIG. 2 representing another alternative embodiment of the invention.

Referring to FIG. 4, another preferred embodiment of the invention is shown in which the charge reservoir 54 is replaced by a programmable constant current source 76 having output levels of constant current set by controller 32, in response to high/low input control from the output of the pulse width modulation detector, at a first, high value during periods of operation prior to onset of X-ray impingement on imaging panel 12 and at a second, lower value immediately after detection of X-ray impingement on panel 12. The purpose of this is to enhance the sensitivity of the feedback detection circuit when the number of pixel capacitors has been reduced from the full panel to the one segment of pixels left connected via switches 47 to virtual ground. Prior to onset of X-ray impingement, a high value of constant current enables rapid charge of capacitor 50 to set the bias voltage for the entire imaging panel. After onset of X-ray impingement, the constant current value is reduced by controller 32 to account for the lowered charge drain on capacitor 50 resulting from the lesser number of pixels connected to virtual ground. With a constant input voltage, the pulse width variations would increase to maintain voltage constant on node 52 constant thereby increasing the detection sensitivity of the pulse width modulation and consequently enhancing the detection of cessation of X-ray impingement on panel 12.

The invention has been described in detail with particular reference to certain preferred embodiments thereof, but it will be understood that variations and modifications can be effected within the spirit and scope of the invention.

The invention claimed is:

1. A digital radiography X-ray imaging sensor adapted for independent detection of the existence of impinging X-rays from a remote X-ray source, comprising:
    an imaging panel including a two-dimensional array of imaging pixels, each of the pixels having an intrinsic capacitor which is charged, directly or indirectly, by the impinging X-rays to establish an image of an object being X-rayed;
    a source of a reference voltage;
    a charge balance capacitor connected at a common node to the pixel intrinsic capacitors;
    a control unit for varying a level of charge injection to the charge balance capacitor in response to changes in charge balance between the pixel capacitors and the charge balance capacitor for maintaining a constant charge voltage on the common node as determined by the reference voltage; and
    a control signal generator responsive to the control unit for generating an output control signal indicating presence of impinging X-rays on the imaging panel when the level of charge injection exceeds a predetermined threshold value.

2. The imaging sensor of claim 1 wherein individual nodes of the pixel capacitors opposite to the common node are connected to a virtual ground prior to detection of X-ray impingement on the imaging panel and all but one segment of individual pixel nodes are disconnected from the virtual ground after detection of X-ray impingement;
    whereby retention of connection of virtual ground to the one segment enables detection of the cessation of impingement of X-rays on the imaging panel.

3. The imaging sensor of claim 2 wherein the control signal generator indicates termination of X-ray impingement when the charge injections with respect to the one segment of pixels remaining connected to virtual ground falls below the predetermined threshold value.

4. The imaging sensor of claim 2 wherein the segment comprises at least one row of pixels.

5. The imaging sensor of claim 3 wherein the control unit comprises a programmable constant current source which outputs a first level of input current to the charge balance capacitor prior to the detection of X-ray impingement and outputs a second, lower level of input current to the charge balance capacitor after the detection of X-ray impingement.

6. The imaging sensor of claim 1 wherein the control unit comprises a programmable constant current source.

7. A digital radiography X-ray imaging sensor adapted for independent detection of the existence of impinging X-rays from a remote X-ray source, comprising:

an imaging panel including a two-dimensional array of imaging pixels, each of the pixels having an intrinsic capacitor which is charged, directly or indirectly, by the impinging X-rays to establish an image of an object being X-rayed;

an external capacitor connected at a common node to the pixel intrinsic capacitors; and an impinging X-ray detection unit including:
(a) a reference voltage source,
(b) a charge source to establish a charge voltage at the common node,
(c) a source of a pulse-width-modulated train of pulses switchably connected to the charge voltage source and the common node to vary injection of charge to the external capacitor to establish a voltage on the common node representative of charge balance between the external capacitor and the pixel capacitors,
(d) a controller operative while awaiting onset of impinging X-rays to set the pulse width of the pulse train at a first duration necessary to maintain the common node voltage at a predetermined value determined by the reference voltage and for adjusting the pulse width to a second duration necessary to maintain the common node voltage at the predetermined value during impingement of the X-rays on the panel, and
(e) a pulse width detection circuit responsive to the second pulse width duration for outputting an X-ray detection signal indicative of impingement of X-rays from the remote source.

8. The imaging sensor of claim 7 wherein individual nodes of the pixel capacitors opposite to the common node are connected to a virtual ground while awaiting detection of the onset of X-ray impingement on the imaging panel and all but one segment of individual pixel nodes are disconnected from the virtual ground after detection the onset of X-ray impingement;

whereby retention of connection of virtual ground to the one segment enables detection of the cessation of impingement of X-rays on the imaging panel.

9. The imaging sensor of claim 8 wherein the control signal generator indicates termination of X-ray impingement when the charge injections with respect to the one segment of pixels remaining connected to virtual ground falls below the predetermined threshold value.

10. The imaging sensor of claim 8 wherein the segment comprises at least one row of pixels.

11. The imaging sensor of claim 8 wherein the charge balance capacitor is a variable capacitor and the control unit includes means for varying the capacitor value after the control signal generator indicates presence of X-ray impingement on the imaging panel.

12. The imaging sensor of claim 8 wherein the charge source is a programmable constant current source which outputs a first level of charge current to the charge balance capacitor prior to the detection of X-ray impingement and outputs a second, lower level of charge current to the charge balance capacitor after the detection of X-ray impingement.

13. The imaging sensor of claim 7 wherein the pulse width is increased to a longer duration during impingement of X-rays on the imaging panel to increase charge on the external capacitor to correspond to increased charge on the array of pixel capacitors.

14. A digital radiography X-ray imaging sensor adapted for independent detection of the existence of impinging X-rays from a remote X-ray source, comprising:

an imaging panel including a two-dimensional array of imaging pixels, each of the pixels having an intrinsic capacitor which is charged, directly or indirectly, by the impinging X-rays to establish an image of an object being X-rayed;

a source of a reference voltage;

a charge balance capacitor connected at a common node to the pixel intrinsic capacitors;

a charge injection source;

a source of a train of pulses switchably connected to the common node and the charge injection source, the pulses being width modulated in response to changes in charge balance between the charge balance capacitor and the imaging pixel capacitors to maintain a constant charge voltage at the common node as determined by the reference voltage, the pulse width durations increasing above a threshold value during onset of impingement of X-rays on the imaging pixels; and a pulse width modulation detector responsive to pulse width durations above the threshold value for generating an output control signal indicating presence of the impinging X-rays on the imaging panel.

15. The imaging sensor of claim 14 wherein individual nodes of the pixel capacitors opposite to the common node are connected to a virtual ground while awaiting detection of the onset of X-ray impingement on the imaging panel and all but one segment of individual pixel nodes are disconnected from the virtual ground after detection the onset of X-ray impingement;

whereby retention of connection of virtual ground to the one segment enables detection of the cessation of impingement of X-rays on the imaging panel.

16. The imaging sensor of claim 15 wherein the control signal generator indicates termination of X-ray impingement when the charge injections with respect to the one segment of pixels remaining connected to virtual ground falls below the predetermined threshold value.

17. The imaging sensor of claim 15 wherein the segment comprises at least one row of pixels.

18. The imaging sensor of claim 15 wherein the charge balance capacitor is a variable capacitor and the control unit includes means for varying the capacitor value after the control signal generator indicates presence of X-ray impingement on the imaging panel.

19. The imaging sensor of claim 15 wherein the charge source is a programmable constant current source which outputs a first level of charge current to the charge balance capacitor prior to the detection of X-ray impingement and outputs a second, lower level of charge current to the charge balance capacitor after the detection of X-ray impingement.

20. An imaging sensor according to claim 14, wherein the output control signal indicates the start of X-ray impingement when the pulse width durations increase above the threshold value and indicates the stop of X-ray impingement when the pulse width durations fall below the threshold value.

21. A method of detecting impingement of X-rays on a digital radiography imaging panel having a two-dimensional array of imaging pixels, each of the pixels having an intrinsic capacitor which is charged, directly or indirectly by the impinging X-rays to establish an image of an object being X-rayed, comprising:

providing an external capacitor connected at a common node to the capacitors of the imaging pixels;

establishing a predetermined bias voltage on the pixel capacitors during a period prior to onset of impingement of the X-rays on the imaging panel by injecting pulses of charge into the external capacitor under control of a pulse train that is pulse width modulated in response to charge voltage sensed at the common node; and detecting the width modulation of the pulse train and generating a output control signal indicative of the onset of impingement of X-rays onto the imaging panel when the detected pulse width exceeds a predetermined threshold value.

22. The method of claim 21 wherein during the prior period, individual nodes of the imaging pixels opposite the common node are connected to a virtual ground potential, the method further including the steps of:

in response to the output signal signifying onset of impingement of X-rays, disconnecting all but one segment of imaging pixels from the virtual ground potential;

continuing to monitor charge balance at the common node between the external capacitor and the one segment of imaging pixels; and generating a second output signal indicative of cessation of the impingement of X-rays when the pulse width falls below the predetermined threshold.

23. The method of claim 22 wherein the one segment comprises at least one row of the pixels.

24. The method of claim 22 further including the step of:

after generating the control signal indicative of the onset of impingement of X-rays, varying the value of the external capacitor so as to enhance detection of the cessation of the impingement of X-rays.

25. The method of claim 22 further including the steps of inputting programmable levels of charge current to the charge balance capacitor;

setting a first level of charge current to the charge balance capacitor prior to detection of X-ray impingement; and setting a second, lower level of charge current to the charge balance capacitor after detection of X-ray impingement.

26. The method of claim 21 further including the steps of:
providing a reference voltage;

controlling the pulse width modulation to maintain charge voltage on the common node at a constant value in relation to the reference voltage;

wherein at onset of X-ray impingement on the imaging panel, the pulse width is increased to maintain charge balance between the external capacitor and the pixel capacitors thereby to maintain the charge value on the common node at the constant value.

27. A digital radiography X-ray imaging sensor adapted for independent detection of the existence of impinging X-rays from a remote X-ray source, comprising:

an imaging panel including a two-dimensional array of imaging pixels, each of the pixels having an intrinsic capacitor which is charged, directly or indirectly, by the impinging X-rays to establish an image of an object being X-rayed;

a source of a reference voltage;

a charge balance capacitor connected at a common node to the pixel intrinsic capacitors;

a control unit for varying a level of charge injection to the charge balance capacitor in response to changes in charge balance between the pixel capacitors and the charge balance capacitor for maintaining a constant charge voltage on the common node as determined by the reference voltage, wherein the control unit includes generator of a pulse width modulated train of pulses for varying the charge injection; and a control signal generator responsive to the control unit for generating an output control signal indicating presence of impinging X-rays on the imaging panel when the level of charge injection exceeds a predetermined threshold value.

28. A digital radiography X-ray imaging sensor adapted for independent detection of the existence of impinging X-rays from a remote X-ray source, comprising:

an imaging panel including a two-dimensional array of imaging pixels, each of the pixels having an intrinsic capacitor which is charged, directly or indirectly, by the impinging X-rays to establish an image of an object being X-rayed;

a source of a reference voltage;

a charge balance capacitor connected at a common node to the pixel intrinsic capacitors;

a control unit for varying a level of charge injection to the charge balance capacitor in response to changes in charge balance between the pixel capacitors and the charge balance capacitor for maintaining a constant charge voltage on the common node as determined by the reference voltage; and a control signal generator responsive to the control unit for generating an output control signal indicating presence of impinging X-rays on the imaging panel when the level of charge injection exceeds a predetermined threshold value;

wherein individual nodes of the pixel capacitors opposite to the common node are connected to a virtual ground prior to detection of X-ray impingement on the imaging panel and all but one segment of individual pixel nodes are disconnected from the virtual ground after detection of X-ray impingement;

whereby retention of connection of virtual ground to the one segment enables detection of the cessation of impingement of X-rays on the imaging panel;

wherein the charge balance capacitor is a variable capacitor and the control unit includes means for varying the capacitor value after the control signal generator indicates presence of X-ray impingement on the imaging panel.

* * * * *